United States Patent [19]

Helldörfer et al.

[11] Patent Number: 4,989,333
[45] Date of Patent: Feb. 5, 1991

[54] NAVIGATION METHOD FOR VEHICLES WITH ELECTRONIC COMPASS

[75] Inventors: Reinhard Helldörfer, Igelsdorf; Ulrich Kanzler, Stein; Hans Rauch, Fürth, all of Fed. Rep. of Germany

[73] Assignee: Robert Bosch GmbH, Stuttgart, Fed. Rep. of Germany

[21] Appl. No.: 347,774
[22] PCT Filed: Oct. 22, 1987
[86] PCT No.: PCT/DE87/00477
§ 371 Date: Apr. 21, 1989
§ 102(e) Date: Apr. 21, 1989
[87] PCT Pub. No.: WO88/05153
PCT Pub. Date: Jul. 14, 1988

[30] Foreign Application Priority Data

Dec. 30, 1986 [DE] Fed. Rep. of Germany ....... 3644681

[51] Int. Cl.$^5$ ............................................. G01C 17/38
[52] U.S. Cl. ......................................... 33/356; 33/357; 33/361; 364/559
[58] Field of Search ................... 33/356, 357, 361; 364/559, 571.01, 571.02

[56] References Cited

U.S. PATENT DOCUMENTS

| 4,414,753 | 11/1983 | Moulin et al. | 33/356 |
|---|---|---|---|
| 4,416,067 | 11/1983 | Scherer et al. | 33/356 |
| 4,546,550 | 10/1985 | Marchent et al. | 33/356 |
| 4,698,912 | 10/1987 | Fowler | 33/356 |
| 4,725,957 | 2/1988 | Alberter et al. | 33/356 |
| 4,729,172 | 3/1988 | Alberter et al. | 33/356 |
| 4,733,179 | 3/1988 | Bauer et al. | 33/356 |
| 4,738,031 | 4/1988 | Alberter et al. | 33/356 |
| 4,782,453 | 11/1988 | Bauer et al. | 33/357 |
| 4,797,841 | 1/1989 | Hatch | 364/559 |
| 4,852,012 | 7/1989 | Suyama | 364/571.02 |

FOREIGN PATENT DOCUMENTS

| 3734064 | 4/1988 | Fed. Rep. of Germany | 33/361 |
|---|---|---|---|
| 0255814 | 11/1987 | Japan | 33/356 |
| 0098920 | 4/1989 | Japan | 33/361 |
| 8502902 | 7/1985 | PCT Int'l Appl. | 33/356 |
| 8805154 | 7/1988 | PCT Int'l Appl. | 33/356 |
| 8805155 | 7/1988 | PCT Int'l Appl. | 33/356 |

*Primary Examiner*—Thomas B. Will
*Attorney, Agent, or Firm*—Michael J. Striker

[57] ABSTRACT

A method for determining the direction of the earth field, the north direction and the travelling direction of a vehicle by way of a magnetometer mounted in the vehicle is based on dynamic compensation or updating of interfering field changes. For this purpose, a resultant vector ($v_K$) is formed from the magnetic field vector ($V_M$) effective at the magnetometer, the previous hard-magnetic interfering field vector ($H_H$) and the nominal vector ($V_P$) determined from the circle diagram (O) of the magnetic field, as interfering field change in accordance with the equation $v_K = V_M - v_B - H_H$ and this vector is weighted with a factor ($k<1$). The weighted resultant vector ($K \times v_K$) is then added to the previous interfering field vector ($H_H$). Using the new hard-magnetic interfering field vector ($H_{H'}$), thus determined, the direction of the earth field is then calculated in known manner and evaluated for navigation.

4 Claims, 2 Drawing Sheets

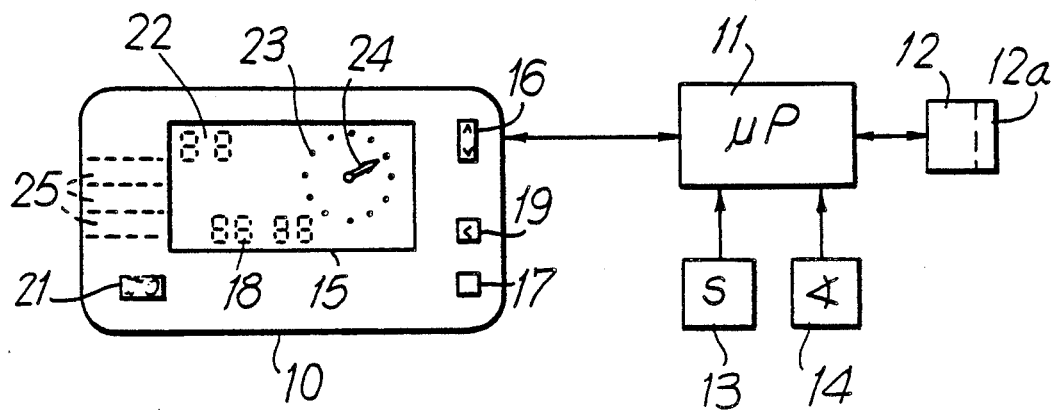
FIG. 1
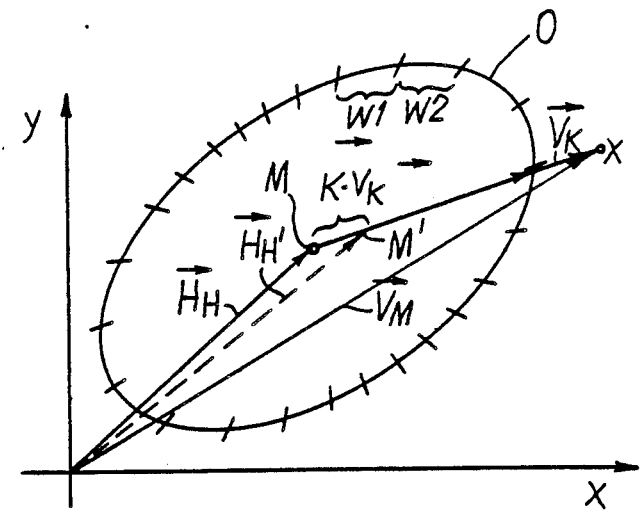
FIG. 3
FIG. 2

NAVIGATION METHOD FOR VEHICLES WITH ELECTRONIC COMPASS

BACKGROUND OF THE INVENTION

The invention is based on a method for determining the direction of the earth magnetic field, the north direction and the travelling direction of a vehicle by means of a magnetometer fixedly mounted on the vehicle to measure components of a magnetic field effective at the magnetometer and by means of an evaluating circuit which cyclically evaluates and stores the measured components as electric measurement values defining parameters of an aliphatic locus diagram of the magnetic field inclusive of the magnitude and direction of hard-magnetic and soft-magnetic interfering fields, and calculates the direction of the earth magnetic field with respect to the travelling direction.

From DE No. 3,509,548 corresponding to the U.S. Pat. No. 4,738,031, the entire disclosure of which is incorporated herein by reference, a method for determining the travelling direction of a vehicle having an electronic compass is known in which, by means of a magnetometer mounted in the vehicle, the magnetic field effective in the vehicle is measured and stored in the form of an elliptical locus diagram in an evaluating circuit and is processed for calculating the earth field direction with reference to the driving direction. A calibration travel is used to determine as parameters of the elliptical locus diagram of the magnetic field the displacement of the locus diagram from the origin of the coordinates, the rotation and the minor and the major semi-axis of the elliptical locus diagram. Furthermore, it is there known to perform, if the cyclically measured magnetic field deviates from the elliptical locus diagram by a predeterminable amount, a recalibration of the locus diagram immediately or if the deviation is repeated several times.

However, such a dynamic recalibration for compensating interfering field changes in the motor vehicle must be conducted in such a manner that interfering fields or interfering field changes occurring for a short time are suppressed, if necessary, whereas longer-duration or slow interfering field changes in the vehicle must be compensated. In this connection, it must be taken into consideration that the interfering fields existing in the vehicle can change in dependence on time and that the field strength of the earth magnetic field is subject to strong fluctuations which are essentially location-dependent. In the case of the interfering fields, this results in a direction-independent interfering field vector as a hard-magnetic component which is changed, in particular, by electric currents flowing in the vehicle. The connecting and disconnecting of individual loads produces abrupt magnetic field disturbances. These can cause remagnetizations in the vehicle steel which result in relatively slow changes of the direction-independent interfering field vector after days or weeks. The direction-dependent interfering field vector, as a soft-magnetic component of the interfering field in the vehicle, changes both due to the change in intensity of the earth field with drives in the north-south direction and also with a remagnetization in the vehicle steel. These, too, are relatively slow interfering field changes.

The present invention has the object of including these interfering field changes with long-term effect step-by-step in the recalibration.

SUMMARY OF THE INVENTION

The method of this invention is characterized in that
(a) for dynamically compensating interfering field changes, the nominal vector ($\vec{v_B}$), which on the elliptical locus diagram (0) is associated with the vector of the magnetic field ($\vec{v_M}$) effective at the magnetometer (14), is first cyclically determined and the nominal vector together with the current hard-magnetic interfering field vector ($\vec{H_H}$) and with the magnetic field vector ($v_M$), form a resultant vector ($\vec{v_K}$) of interfering field change,
(b) the resultant vector ($\vec{v_k}$) of the interfering field change is weighted with a factor ($k<1$),
(c) the weighted resultant vector ($k.v_k$) is added to the current hard-magnetic interfering field vector ($\vec{H_H}$) to determine a new hard-magnetic interfering field vector ($\vec{H_{H'}}$), and
(d) the direction of the earth magnetic field is calculated by means of the new hard-magnetic interfering field vector ($\vec{H_{H'}}$).

The method according to the invention has the advantage that a cyclically determined interfering field change with respect to the elliptical locus diagram can be weighted with a factor of less than 1 in such a manner that shortterm changes of the magnetic field at the magnetometer remain virtually ineffective. A result, anomalies or disturbances in the determination of the earth field, for example when driving through tunnels, under bridges and similar, can be relatively well suppressed. A further advantage must be considered the fact that the updating of the direction-independent interfering field vector can be performed independently of the updating of the direction-dependent interfering field vector and the recalibration can thus be further improved. In this connection, it is particularly advantageous for the weighting of interfering field changes if the factor k for the direction of the interfering field change is selected, in dependence on the cycle time of the measurement value acquisition, in such a manner that interfering field changes occurring for a short time over a few seconds are almost suppressed. In contrast, interfering field changes occurring over a longer time due to connection or disconnection of loads in the motor vehicle over several minutes should be fully updated as a result of the weighting factor k. To compensate the soft-magnetic interfering field changes dynamically in the motor vehicle, it is very advantageous to arrange a data buffer in the evaluating circuit into a particular number of spaces which are allocated to an equal number of equally large angle segments of the elliptical locus diagram, and in which cyclically acquired measurement values of the magnetometer are directly or indirectly stored at the spaces of the data buffer corresponding to their angle segments. As soon as an adequate predetermined number of measurement values is stored in the data buffer, the parameters for the elliptical locus diagram are recalculated from these measurement values in known manner, for example in accordance with the DE No. 3,509,548. The previous parameters are then corrected by averaging with the recalculated values and are stored.

A higher accuracy in the calculation of the new parameters of the elliptical locus diagram is advantageously obtained when several measurement values for each quadrant of the elliptical locus diagram are stored in the data buffer. Drawing An illustrative embodiment according to the invention is shown in the drawing and explained in greater detail in the description below. FIG. 1 shows a navigation system for a motor vehicle in a block diagram, FIG. 2 shows the elliptical locus diagram of the magnetic field effective at the magnetometer of the navigation system, FIG. 3 shows a data buffer for storing the cyclically acquired measurement values of the magnetometer for a dynamic recalibration and FIG. 4 is a flow chart of the partial correction or updating of the soft-magnetic and hard-magnetic interfering field vectors.

DESCRIPTION OF THE PREFERRED EMBODIMENT

Figure 4:
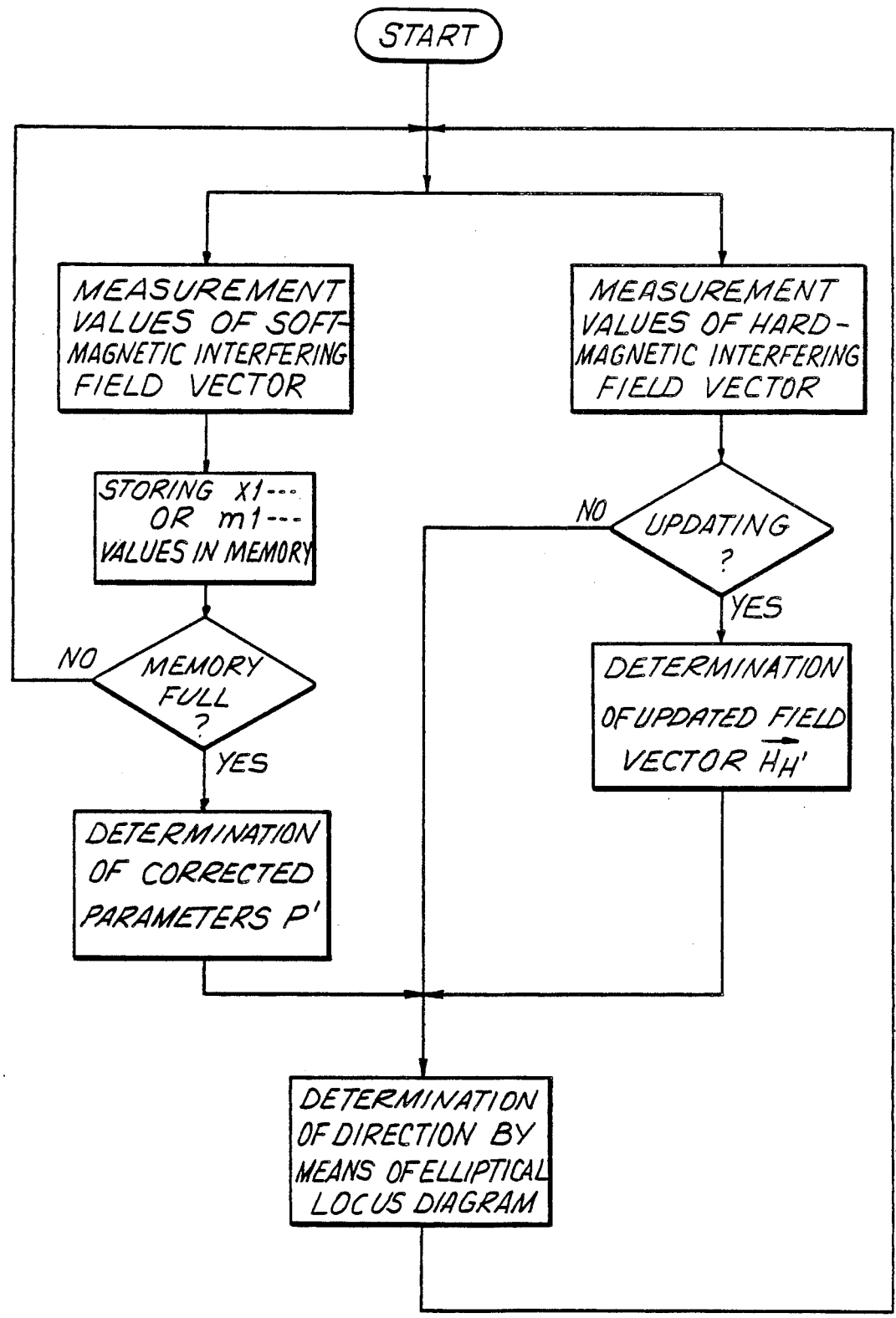

FIG. 1 shows a compound navigation system for vehicles, by means of which the driver can find the desired destination in strange surroundings by specifying the direction of the destination and the linear distance (homing system). It consists of an input and output unit 10, a microprocessor 11 with a data memory 12, and of a position transmitter 13 and a travel direction transmitter 14. The microprocessor 11 is usually also contained, together with the data memory 12, in the input and output unit 10. As a position transmitter 13, pulse transmitters of a tacho-generator or corresponding transmitters at the vehicle wheels can be used which may already exist in the vehicle, for example for a travel data computer or for an antiblocking system. A magnetometer or a magnetic field meter should be used as travel direction transmitter. The microprocessor processes the signals emitted by the position transmitter 13 and by the magnetometer 14 and executes the control and input commands activated by the operating keys of the unit 10. It furthermore controls the output of data and direction arrows on a liquid crystal display 15 of the unit 10. Numerical values can be changed in the direction of higher and lower on the LCD 15 by means of a toggle switch 16. The current numerical value displayed on the LCD 15 is in each case stored by operating an acknowledgement key 17 and is output on a display 18 in the lower area of the LCD 15. A function selection key 19 is used to switch the navigation system over within a menu offered, in accordance with an inscription 25 on the left-hand edge area of the unit 10, the information items displayed in each case on the LCD 15 being identified by an arrow 20 on the LCD 15 at the level of the inscription 25. A further keyswitch 21 is used for switching the compound navigation system on and off. A 7-segment display 22 in the upper LCD area is used for identifying 99 different preset destinations. A compass rose 23 of the LCD 15, having 16 different invisible arrow segments, is used for direction information, the activated direction arrow 24 representing either the north direction or the direction of the travelling destination.

The magnetometer 14 mounted in the vehicle has two probes, offset by 90° with respect to one another and aligned in the plane of travelling of the vehicle, which output the components of the magnetic field effective at the magnetometer 14 and measured by them in the form of electric measurement values which are cyclically acquired and evaluated in the evaluating circuit for determining the elliptical locus diagram of the magnetic field. As described in greater detail in the aforementioned DE No. 3,509,548, the displacement of the centre of the elliptical locus curve from the origin of the coordinates represents a direction-independent interfering field vector $\vec{H_H}$ according to FIG. 2. This interfering field vector forms the hard-magnetic part of the interfering fields in the motor vehicle which should be updated relatively quickly in the case of changes due to connection or disconnection of loads in the motor vehicle. The remaining parameters of the elliptical locus diagram 0 of all measurement values output by the magnetometer 14 and acquired by the evaluating circuit, that is to say the rotation as well as the major and the minor semiaxis of the elliptical locus diagram 0 in the x, y system of coordinates are also calculated by the microprocessor 10 in a manner known from the DE No. 3,509,548 and stored in the data memory 12.

The dynamic compensation of interfering field changes of the hard-magnetic part in the motor vehicle is to be explained in greater detail with the aid of FIG. 2. Such interfering field changes cause a displacement of the centre M of the locus diagram 0 to the center M' of a non-illustrated locus diagram. To detect such a displacement and correspondingly update the locus diagram 0, the nominal vector $\vec{r_B}$ which on the eliptical locus diagram 0 is associated with the vecter $\vec{r_M}$ of the magnetic field effective at the magnetometer 14, is first cyclically determined in the evaluating circuit. This nominal vector, together with the current hard-magnetic interfering field vector $\vec{H_H}$ and the magnetic field vector $\vec{r_M}$, from a resultant vector $\vec{V_K}$ of the interfering field change in accordance with the equation:

$$\vec{V_K} = \vec{V_M} - \vec{V_B} - \vec{H_H}$$

The resultant vector $\vec{V_K}$ of the interfering field change thus determined is then weighted with a factor k<1 of, for example, k=0.1 with a cycle time of T=100 ms. The weighted resultant vector $k \times \vec{V_K}$ is subsequently added to the current hard-magnetic interfering field vector $\vec{H_H}$. In accordance with the equation:

$$\vec{H_H'} = \vec{H_H}\text{ old} + (K \times \vec{V_K})$$

new hard-magnetic interfering field vector $H_h'$ is determined and is then used for recalculating the direction of the earth field and further processing for navigating the vehicle.

For the calculation of the interfering field change, the factor k must be selected in dependence on the cycle time since updating or compensating of interfering field changes takes longer with increasing cycle time if the factor k is unchanged. In the illustrative embodiment, the factor k and the cycle time have been selected in such a manner that interfering field changes occurring within a short time over a few seconds are virtually suppressed whereas interfering field changes which occur over a long time over several minutes due to the connection or disconnection of loads in the motor vehicle are fully updated or compensated by the factor k.

However, the recalibration described above does not cover the soft-magnetic interfering field changes since these are direction-dependent on the magnetic field effective at the magnetometer and cause a change in the rotation and the semiaxes of the elliptical locus diagram 0. Such soft-magnetic interfering field changes are therefore compensated or updated by means of a further method explained in greater detail with the aid of FIG. 3. For this purpose, a data buffer 12a in the data memory 12 is divided into a particular number of memory cells, for example from 1 to 24. These cells are allocated to a corresponding number of equal angle segments w1, w2 of the elliptical locus diagram 0 according to FIG. 2. The cyclically acquired measurement values x of the magnetometer 14 are stored at the memory cells 1, 2 ... of the data buffer 12a assigned to the equal angle segments w1, w2 ... If a particular number of measurement values x1, x2 ... is stored in the data buffer 12a, the rotation and the semiaxes of the elliptical locus diagram are recalculated manner from these measurement values as new parameters $P_{new}$ for the elliptical locus diagram 0. Finally, the previous parameters $P_{old}$ are corrected by averaging with the recalculated parameter values, in accordance with the equation:

$$P' = P_{old} + k(P_{new} - P_{old}) \text{ with } k < 1; \text{ or:}$$

$$P' = \tfrac{1}{2}(P_{old} + P_{new}) \text{ with P' as corrected parameter value.}$$

The measurement values are subsequently deleted in the data buffer 12a so that new measurement values can now be read into the memory 12 again for a further recalibration of the locus diagram 0.

According to the preferred embodiment, it is provided that at least one measurement x1, value x2 ..., must be stored for each angle segment w1, w2 ... of the elliptical locus diagram in the data buffer 12a before the locus diagram parameters can be recalculated. If there are several measurement values for one angle segment, these are averaged out and their mean value m1, m2 .. is stored at the corresponding memory cell 1, 2 ... in the data buffer 12a. In this manner, slow changes of the interfering field, for example due to a remagnetization in the vehicle steel of the motor vehicle, are detected which extend over days or weeks. Location-related changes in the intensity of the earth field to be measured are also updated over a long time by this method. A faster updating or compensation of interfering field changes is possible, for example, by the fact that, for recalculating the ellipse parameters, only a few measurement values for each quadrant of the elliptical locus diagram 0 need be stored in the data memory 12 to trigger a new calculating and correcting cycle.

The dynamic compensation or updating of the soft-magnetic interfering field changes according to FIG. 3 in the evaluating circuit of the navigation system is effected independently and in parallel with the dynamic compensation or updating of the hard-magnetic interfering field changes according to FIG. 2 by means of appropriate program routines of the microprocessor 11 shown by way of an example in FIG. 4.

We claim:

1. In a method for determining the direction of the earth magnetic field, the north direction and the travelling direction of a vehicle by means of a magnetometer fixedly mounted in said vehicle to measure components of a magnetic field effective at the magnetometer and by means of an evaluation circuit which cyclically evaluates and stores the measured components as electric measurement values defining parameters of an elliptical locus diagram of the magnetic field, inclusive of the magnitude and direction of hard-magnetic and soft-magnetic interfering fields, and calculates the direction of the earth magnetic field with respect to the travelling direction, an improvement comprising the steps of
    (a) cyclically determining a nominal vector ($\bar{v}_B$) which on the elliptical locus diagram is associated with a vector ($\bar{v}_M$) of the magnetic field effective at a magnetometer;
    (b) determining from the nominal vector ($\bar{v}_B$), a current hard-magnetic interfering field vector ($\bar{H}_H$) and the magnetic field vector ($\bar{v}_M$) a resultant vector ($\bar{v}_K$) which indicates a change of the hard-magnetic interfering field;
    (c) weighting the resultant vector ($\bar{v}_K$) with a factor $k < 1$,
    (d) adding the weighted resultant vector ($k \cdot \bar{v}_K$) to the current hard-magnetic interfering vector ($\bar{H}_H$) to form a new hard-magnetic interfering field vector ($\bar{H}_{H'}$), and
    (e) for dynamically compensating changes of the hard-magnetic interfering field, calculating the direction of the earth magnetic field with respect to the travelling direction by using the new hard-magnetic interfering field vector ($\bar{H}_{H'}$)
    (f) selecting the factor k in dependence on the cycle time (T) of the measurement value acquisition, in such a manner that the interfering field changes ($v_K$) occurring for a short time over a few seconds are almost suppressed.

2. Improvement as defined in claim 1, further comprising the steps of successively storing the evaluated measurement values in a data buffer having a particular number of memory cells which are allocated to a corresponding number of equal angle segments (w) of the elliptical locus diagram (0); after the particular number of memory cells has been filled with the successive measurement values, recalculating from the stored measurement values new parameters for the elliptical locus diagram; and correcting the previous parameters ($P_{old}$) by averaging them with the recalculated new parameters ($P_{new}$) to dynamically compensate changes of the soft-magnetic interfering field.

3. Improvement according to claim 1, wherein several measurement values (x) for each quadrant of the elliptical locus diagram (0) must be stored in the data buffer (12a) for the recalculation of the parameters (P).

4. In a method for determining the direction of the earth magnetic field, the north direction and the travelling direction of a vehicle by means of a magnetometer fixedly mounted in said vehicle to measure components of a magnetic field effective at the magnetometer and by means of an evaluation circuit which cyclically evaluates and stores the measured components as electric measurement values defining parameters of an elliptical locus diagram of the magnetic field, inclusive of the magnitude and direction of hard-magnetic and soft-magnetic interfering fields, and calculates the direction of the earth magnetic field with respect to the travelling direction, an improvement comprising the steps of
    (a) cyclically determining a nominal vector ($\bar{v}_B$) which on the elliptical locus diagram is associated with a vector ($\bar{v}_M$) of the magnetic field effective at the magnetometer;
    (b) determining from the nominal vector ($\bar{v}_B$), a current hard-magnetic interfering field vector ($\bar{H}_H$) and the magnetic field vector ($\bar{v}_M$) a resultant vector ($\bar{v}_K$) which indicates a change of the hard-magnetic interfering field;
    (c) weighting the resultant vector ($\bar{v}_K$) with a factor $k < 1$,
    (d) adding the weighted resultant vector ($k \cdot \bar{v}_K$) to the current hard-magnetic interfering vector ($\bar{H}_H$) to form a new hard-magnetic interfering field vector ($\bar{H}_{H'}$),
    (e) for dynamically compensating changes of the hard-magnetic interfering field, calculating the direction of the earth magnetic field with respect to the travelling direction by using the new hard-magnetic interfering field vector ($\overline{H}_H$), (f) and fully updating the interfering field changes ($v_K$) occurring over a long time over several minutes due to connection of disconnection of loads in the vehicle, as a result of the factor k.

* * * * *